(12) United States Patent
Mignone

(10) Patent No.: US 7,826,525 B2
(45) Date of Patent: Nov. 2, 2010

(54) PULSE-BASED COMMUNICATION FOR DEVICES CONNECTED TO A BUS

(75) Inventor: Thomas A. Mignone, North Falmouth, MA (US)

(73) Assignee: Illinois Tool Works, Inc., Glenview, IL (US)

( * ) Notice: Subject to any disclaimer, the term of this patent is extended or adjusted under 35 U.S.C. 154(b) by 930 days.

(21) Appl. No.: 11/675,927

(22) Filed: Feb. 16, 2007

(65) Prior Publication Data

US 2008/0198917 A1    Aug. 21, 2008

(51) Int. Cl.
*H04B 3/00* (2006.01)
*H04L 25/00* (2006.01)

(52) U.S. Cl. ............... 375/237; 375/256; 375/257; 375/259

(58) Field of Classification Search ........... 375/237, 375/242, 256, 257, 259
See application file for complete search history.

(56) References Cited

U.S. PATENT DOCUMENTS

| | | | |
|---|---|---|---|
| 3,715,745 A * | 2/1973 | Arciprete | 341/86 |
| 3,943,283 A | 3/1976 | Caragliano et al. | |
| 4,011,541 A | 3/1977 | Fabry et al. | |
| 4,071,908 A | 1/1978 | Brophy et al. | |
| 4,118,700 A | 10/1978 | Lenihan | |
| 4,156,232 A | 5/1979 | Blass | |
| 4,477,896 A | 10/1984 | Aker | |
| 4,677,308 A | 6/1987 | Wroblewski et al. | |
| 4,716,409 A * | 12/1987 | Hart et al. | 340/825.22 |
| 4,736,367 A | 4/1988 | Wroblewski et al. | |
| 4,741,418 A | 5/1988 | Kaiser | |
| 4,899,338 A | 2/1990 | Wroblewski | |
| 4,907,223 A | 3/1990 | Wroblewski | |
| 4,908,822 A | 3/1990 | Wroblewski | |
| 4,914,419 A | 4/1990 | Bragenzer et al. | |
| 4,920,532 A | 4/1990 | Wroblewski | |
| 4,959,831 A | 9/1990 | Wroblewski | |
| 4,965,550 A | 10/1990 | Wroblewski | |
| 4,982,371 A | 1/1991 | Bolan et al. | |
| 5,036,320 A | 7/1991 | Wroblewski | |
| 5,045,675 A | 9/1991 | Carry | |
| 5,134,617 A | 7/1992 | McRoy | |
| 5,155,382 A | 10/1992 | Madden et al. | |
| 5,210,846 A | 5/1993 | Lee | |
| 5,237,322 A | 8/1993 | Heberle | |

(Continued)

FOREIGN PATENT DOCUMENTS

EP    1284556 A    2/2003

(Continued)

OTHER PUBLICATIONS

International Search Report for PCT/US2007/089188, dated Sep. 25, 2008.

*Primary Examiner*—David B Lugo
(74) *Attorney, Agent, or Firm*—Boyle Fredrickson, S.C.

(57) ABSTRACT

A method for communicating data is disclosed. The method includes receiving a sequence of electrical pulses during an interval having a pre-determined time period, the sequence of electrical pulses representing a message from one of a plurality of devices, determining the number of received electrical pulses in the sequence of electrical pulses, and decoding the message based on the determined number of electrical pulses received during the interval.

22 Claims, 12 Drawing Sheets

U.S. PATENT DOCUMENTS

| | | |
|---|---|---|
| 5,398,326 A | 3/1995 | Lee |
| 5,410,710 A | 4/1995 | Iwasyk |
| 5,412,644 A | 5/1995 | Herberle |
| 5,483,176 A | 1/1996 | Rodriguez et al. |
| 5,488,284 A | 1/1996 | Dias et al. |
| 5,495,240 A | 2/1996 | Heberle |
| 5,506,991 A | 4/1996 | Curry et al. |
| 5,517,172 A | 5/1996 | Chiu |
| 5,546,003 A | 8/1996 | Noworolski et al. |
| 5,555,420 A | 9/1996 | Sarangdhar et al. |
| 5,612,633 A | 3/1997 | Kean |
| 5,619,196 A | 4/1997 | Escobosa |
| 5,627,361 A | 5/1997 | Lee |
| 5,630,755 A | 5/1997 | Walsh et al. |
| 5,694,024 A | 12/1997 | Dias et al. |
| 5,751,746 A | 5/1998 | Strauss |
| 5,761,697 A | 6/1998 | Curry et al. |
| 5,790,526 A | 8/1998 | Kniess et al. |
| 5,809,518 A | 9/1998 | Lee |
| 5,809,519 A | 9/1998 | Lee |
| 5,832,207 A | 11/1998 | Little et al. |
| 5,862,354 A | 1/1999 | Curiger et al. |
| 5,864,872 A | 1/1999 | Lee et al. |
| 5,867,006 A | 2/1999 | Dias et al. |
| 5,920,096 A | 7/1999 | Lee |
| 5,936,520 A | 8/1999 | Luitje et al. |
| 5,974,504 A | 10/1999 | Lee et al. |
| 5,994,770 A | 11/1999 | Harrington et al. |
| 6,016,255 A | 1/2000 | Bolan et al. |
| 6,018,228 A | 1/2000 | Dias et al. |
| 6,108,751 A | 8/2000 | Lee et al. |
| 6,112,275 A | 8/2000 | Curry et al. |
| 6,122,704 A | 9/2000 | Hass et al. |
| 6,160,857 A | 12/2000 | Yang |
| 6,219,789 B1 | 4/2001 | Little et al. |
| 6,298,066 B1 | 10/2001 | Wettroth et al. |
| 6,300,743 B1 | 10/2001 | Patino et al. |
| 6,301,344 B1 | 10/2001 | Meyer et al. |
| 6,412,072 B2 | 6/2002 | Little et al. |
| 6,487,674 B1 | 11/2002 | White et al. |
| 6,552,650 B1 | 4/2003 | Gokcebay et al. |
| 6,563,284 B2 | 5/2003 | Teutsch et al. |
| 6,606,353 B1 * | 8/2003 | McDowell et al. .......... 375/224 |
| 6,608,571 B1 | 8/2003 | Delvaux |
| 6,697,897 B1 | 2/2004 | Friel et al. |
| 6,735,657 B1 | 5/2004 | Falk et al. |
| 6,761,156 B2 | 7/2004 | Zarkhin et al. |
| 6,783,425 B2 | 8/2004 | McKeefery |
| 6,831,925 B1 | 12/2004 | Subrahmanyan et al. |
| 6,850,607 B2 | 2/2005 | Meyer et al. |
| 6,969,970 B2 | 11/2005 | Dias et al. |
| 7,028,105 B2 | 4/2006 | Duté et al. |
| 7,042,363 B2 | 5/2006 | Katrak et al. |
| 7,053,667 B1 | 5/2006 | Tang |
| 7,062,181 B2 | 6/2006 | Buchheit |
| 7,079,589 B1 | 7/2006 | Maksimovic et al. |
| 7,080,266 B2 | 7/2006 | D'Angelo et al. |
| 7,095,250 B1 | 8/2006 | Stolitzka et al. |
| 2004/0021510 A1 | 2/2004 | Takasu et al. |
| 2006/0086080 A1 * | 4/2006 | Katogi et al. .................. 60/278 |
| 2008/0059667 A1 * | 3/2008 | Berenbaum et al. ......... 710/110 |

FOREIGN PATENT DOCUMENTS

| | | |
|---|---|---|
| GB | 2095014 A | 9/1982 |
| WO | WO 2006/137094 A | 12/2006 |

* cited by examiner

| | Command Bit | Command type | | | | |
|---|---|---|---|---|---|---|
| 0  | 0 | 0 | 0 | 0 | 0 | Data |
| 1  | 0 | 0 | 0 | 0 | 1 | |
| 2  | 0 | 0 | 0 | 1 | 0 | |
| 3  | 0 | 0 | 0 | 1 | 1 | |
| 4  | 0 | 0 | 1 | 0 | 0 | |
| 5  | 0 | 0 | 1 | 0 | 1 | |
| 6  | 0 | 0 | 1 | 1 | 0 | |
| 7  | 0 | 0 | 1 | 1 | 1 | |
| 8  | 0 | 1 | 0 | 0 | 0 | |
| 9  | 0 | 1 | 0 | 0 | 1 | |
| 10 | 0 | 1 | 0 | 1 | 0 | |
| 11 | 0 | 1 | 0 | 1 | 1 | |
| 12 | 0 | 1 | 1 | 0 | 0 | |
| 13 | 0 | 1 | 1 | 0 | 1 | |
| 14 | 0 | 1 | 1 | 1 | 0 | |
| 15 | 0 | 1 | 1 | 1 | 1 | |
| 16 | 1 | 0 | 0 | 0 | 0 | DEV 0 Addressed |
| 17 | 1 | 0 | 0 | 0 | 1 | DEV 1 |
| 18 | 1 | 0 | 0 | 1 | 0 | DEV 2 |
| 19 | 1 | 0 | 0 | 1 | 1 | DEV 3 |
| 20 | 1 | 0 | 1 | 0 | 0 | DEV 4 |
| 21 | 1 | 0 | 1 | 0 | 1 | DEV 5 |
| 22 | 1 | 0 | 1 | 1 | 0 | DEV 6 |
| 23 | 1 | 0 | 1 | 1 | 1 | DEV 7 |
| 24 | 1 | 1 | 0 | 0 | 0 | Global command(s) |
| 25 | 1 | 1 | 0 | 0 | 1 | |
| 26 | 1 | 1 | 0 | 1 | 0 | |
| 27 | 1 | 1 | 0 | 1 | 1 | |
| 28 | 1 | 1 | 1 | 0 | 0 | |
| 29 | 1 | 1 | 1 | 0 | 1 | |
| 30 | 1 | 1 | 1 | 1 | 0 | |
| 31 | 1 | 1 | 1 | 1 | 1 | |

FIG. 8

PULSE-BASED COMMUNICATION FOR DEVICES CONNECTED TO A BUS

TECHNICAL FIELD

This invention relates to data communication, and in particular to data communication between devices connected to a communication bus.

BACKGROUND

To control multiple devices using a central control unit, the multiple devices may be connected to a common bus and may communicate with the control module, and with each other, using some pre-defined protocol. Examples of such interconnected devices include computer networks mat include multiple-deployed terminals connected to a central server.

In some applications, separate devices connected to a common bus communicate data to each other by transmitting 'bits' in a timed sequence and a fixed format, with the bits having binary weighted values that depend on their position. For example, connected devices may transmit eight (8) bits in a sequence, with the bits having weights of $2^0, 2^1, 2^2, 2^3, 2^4 \ldots 2^7$. Using this particular scheme, a number in a range of 0-255 may be encoded, and larger numeric representation can be achieved by concatenating sequentially transmitted bytes. Under some circumstances, control bits (e.g., 'Start Bit', 'Stop Bit') may be used with such transmitted communication sequences, thus resulting in bit sequences that include data bits and control bits.

Communication schemes that are based on weighted bits require, careful synchronization and timing control of the transmitted communications because, bits that are out of place in a communicated bit-sequence will be weighed erroneously. Consequently, interconnected devices generally have to transmit data at a common rate and adhere to a specific synchronization and timing control scheme, or else erroneous decoding of the data may result.

SUMMARY

In one aspect, a method for communicating data is disclosed. The method includes receiving a sequence of electrical pulses during an interval having a pre-determined time period, the sequence of electrical pulses representing a message from one of a plurality of devices. determining the number of received electrical pulses in the sequence of electrical pulses, and decoding the message based on the determined number of electrical pulses received during the interval.

Embodiments may include one of more of the following.

The method may further include transmitting an address message identifying the one of the plurality of devices. Transmitting the sequence of electrical pulses may be performed in response to the address message. The address message may include a second sequence of electrical pulses.

The plurality of devices may include eight devices, and the address message may include between 16 and 23 electrical pulses, the number of electrical pulses being indicative of the one of the plurality of devices.

The one of the plurality of devices may include a processor-based device electrically coupled to a multi-position switch. Receiving the message from the one of the plurality of devices may include receiving data regarding a switch position of the multi-position switch of the one of the plurality of devices. The multi-position switch of the one of the plurality of devices may have sixteen positions, and the number of received electrical pulses representing the switch position of the multi-position switch of the one of the plurality of devices may be between 1 and 16.

The method may farther include transmitting a global message to at least some of the plurality of devices, each of the at least some of the plurality of devices having a corresponding multi-position switch, the global message representing a request to the at least some of the plurality of devices to determine the position of the respective multi-position switch of each of the at least some of the plurality of devices.

Determining the number of electrical pulses may include measuring the elapsed time from the beginning of the interval.

The method may further include transmitting another address message after decoding the message, the other address message identifying another device of the plurality of devices, and repeating the receiving, determining and decoding for another sequence of electrical pulses representing another message sent by the other device of the plurality of devices.

In another aspect, a method of communication data is disclosed. The method includes transmitting an address message identifying one of a plurality of devices, the one of the plurality of devices includes a processor-based device electrically coupled to a multi-position switch, receiving, in response to the address message, a sequence of electrical pulses representing a message sent by the one of the plurality of devices, the sequence of electrical pulses representing a switch position of the multi-position switch of the one of the plurality of devices, determining the number of electrical pulses in the sequence of electrical pulses received during an interval having a predetermined, lime period, and determining the switch position of the one of the plurality of devices based on the determined number of electrical pulses received during the interval.

Embodiments of the method may include one or more of the features as set forth above, and may also include one or more of the following.

The method may further include generating, based on a determined switch, position, a control signal to control one or more electrical loads.

The one or mere electrical loads may include, for example, a motor and/or a heating element.

In yet another aspect, a system is disclosed. The system includes a plurality of slave devices each having a corresponding multi-position switch, a control device in electrical communication with the plurality of slave devices, the control device including a processor and a memory module for storing computer instructions. When executed, the computer instructions cause the processor to receive a sequence of electrical pulses during an interval having a pre-determined time period, the sequence of electrical pulses representing a message from one of the plurality of slave devices, determine the number of received electrical pulses in the sequence of electrical pulses, and decode the message based on the determined number of electrical pulses received during the interval.

Embodiments of the system may include one or more of the features as set forth above, and may also include one or more of the following.

The system may further include a bus structure configured to electrically connect the control device with the plurality of slave devices. The bus structure may be a 3-wire bus structure. At least one of the wires of the bus structure may be configured to communicate the sequence of electrical pulses from the one of the plurality of slave devices to the control device.

The control device may further include a timing circuit configured to measure elapsed time from the beginning of the interval.

In a further aspect a device identified by a device address is disclosed. The device includes a multi-position switch configured to be placed in a plurality of positions, a processor electrically coupled to the multi-position switch, a memory module electrically coupled to fee processor, the memory module storing instructions. When executed, the instructions cause the processor to receive a first sequence of electrical pulses representing an address message to identify one of a plurality of devices, determine the number of electrical pulses received in an interval having a pre-determined time period, and based on the determined number of the electrical pulses in the first sequence matching the device address, transmit a second sequence of electrical pulses, the number of electrical pulses in the second sequence being representative of a current position of the multi-position switch.

Embodiments of the system may include one or more of the features as set forth above, and may also include the following.

The memory module may further include stored instructions that when executed cause the processor to receive another sequence of electrical pulses corresponding to a global message representing a request to the device to determine the current switch position of the device, and in response to the other sequence of electrical pulses, determine the switch position of the multi-position switch.

Advantages of the disclosed methods, system and/or devices include one or more of the following.

Use of a common bus enables the devices to be located remotely from the main control board. This enables the control functions to be consolidated at a single control device that is connected close to the loads (e.g., motors) that are to be controlled.

The great tangle of wiring harness bundles connecting switches to the loads in conventional appliance designs is eliminated and replaced with a single multi-wire cable (e.g., three wires), which serves as the common bus, thus reducing costs further by greatly simplifying assembly.

The communication protocol and scheme described herein can support multiple commands including a switch identification command, a command requesting return of switch properties information, etc.

The communications hardware in its simplest form generally requires relatively inexpensive components (e.g., off-the-shelf commercial components) to implement suitable bus interfacing mechanisms.

For applications designed to communicate mechanical switch positions, the microprocessor employed by the devices hides the complexity of the switch mechanics. Any switch type may be interfaced to the common bus via the corresponding switch mounted microprocessor. Switch closures, wiper positions, digital states, etc., can ail be read by the local microprocessors and be converted to a common format for the data stream that is read directly by the master control unit. The control unit microprocessor itself requires only one bi-directional I/O pin to interface to the bus.

Using embodiments of the communication schemes described herein enables to read and communicate a switch position with a single inexpensive microprocessor.

The switches can be substantially cheaper (and potentially safer) as they may switch low voltages at low currents, and share common interface hardware components. Removing the demands for switching high voltages and currents can also increase reliability.

Other features and advantages of the invention will be apparent from the description and from the claims.

DESCRIPTION OF THE DRAWINGS

FIG. 8 is a table that summarizes exemplary message values that may be used with the pulse-based scheme used with the system of FIG. 1.

Like reference symbols in the various drawings indicate like elements.

DETAILED DESCRIPTION

Figure 1:
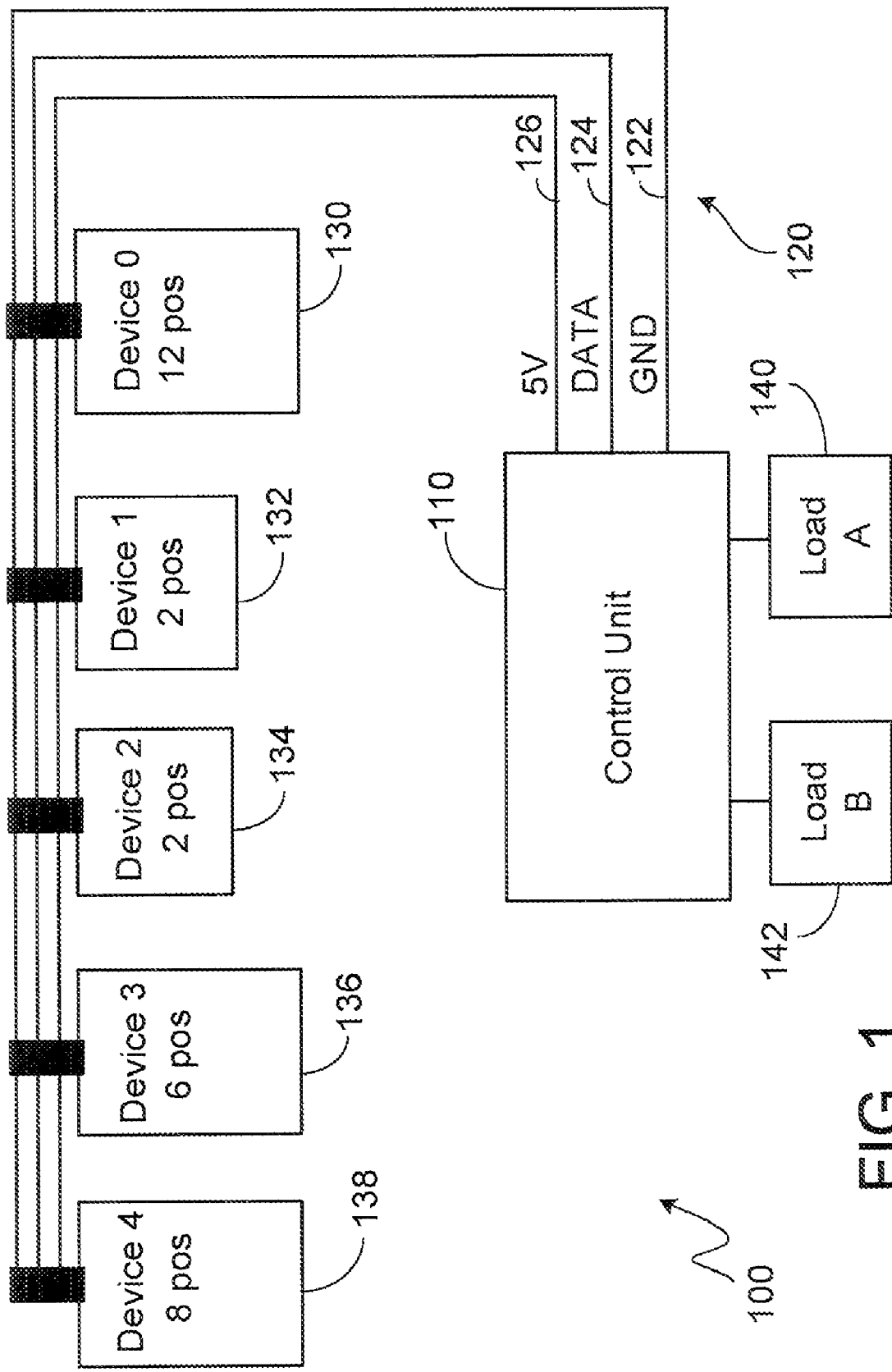
FIG. 1 is a schematic diagram of an exemplary embodiment of a multi-device system in which devices are interconnected via a bus.

FIG. 1 is a schematic diagram of an exemplary embodiment of a system 100 that includes multiple devices interconnected through a bus. As shown, system 100 includes a processor-based control device 110 (sometimes referred to as the "master device") connected to a bus 120, which in turn is connected to a plurality of devices 130, 132, 134, 136 and 138. Devices 130, 132, 134, 136 and 138 are processor-based devices and sometimes are referred to as "slave devices". Each, of the slave devices is identified by a unique address that enables the control device 110 to direct communication to a particular slave device using that unique address. The control device 110 is in electrical communication with one or more loads, such as first load 140 and second load 142, that it controls in accordance with messages it receives from the slave devices. In some embodiments, the one or more load is the motor of an appliance (e.g., a laundry machine), and the slave devices include multi-position switches that are used to specify operational parameters for the motor (e.g., one switch specifying duration of the washing operation, one switch specifying power level, etc.). For such embodiments, the control device generates control signals, based on the information regarding the switch positions that it receives from the slave devices, to regulate the operation of the motor or of other devices, including display devices. In some embodiments the one or more loads are heating elements (e.g., stovetop heating elements) that are connected to electromechanical devices (e.g., relay devices). The heating elements can each correspond to one of the slave devices whose respective multi-position switches may be used to specify the power level at which the corresponding heating elements should operate.

For the purpose of illustration, only five slave devices, two load devices and one control device are shown in FIG. 1. However, additional master, slave devices and/or load devices may be added as needed or as desired. In some embodiments, the load devices may not form part of the system 100.

The system 100 is configured to have messages, formatted as electrical pulses, transmitted and received by the control device 110 and the slave devices 130, 132, 134, 136 and 138. The electrical pulses may be transmitted via a hardwired bus structure, or via wireless transmission. Any of the messages communicated between the various interconnected devices (i.e., the control device 110 and/or the slave devices) includes a pulse train in which the number of pulses transmitted during a time interval having a pre-determined time period, represents the particular communicated message. For example, a pulse train having a single pulse can represent the value '0' whereas a pulse train that includes fourteen (14) electrical, pulses can represent, in some embodiments, the decimal value 13. The pulses sent are not weighted, and thus the actual time it takes to transmit, a particular pulse train, the period of any given pulse in the train, the shape of the pulse and/or any other characteristics associated with the pulses is not determinative for decoding the communicated message. As will be described below, the devices interconnected to the bus 120 simply count the number of pulses received during a particular time period, and use the number of pulses counted to decode the message and perform operations in response thereto. Because messages decoded using such a pulse-based communication scheme do not depend on the exact timing and synchronization of individual pulses in the pulse train or sequence, communication between devices whose pulse synchronization and timing characteristics are different can nonetheless communicate with each other. For example, system 100 may include one device that generates messages having electrical pulses whose width is 10 ms, while another device may generates messages in which every electrical pulse has a width of 20 ms. Even though the two devices have different pulse characteristics, and even though the timing requirements for sending messages from either device may be different, messages sent by the two devices that both contain the same number of pulses (e.g., 14 pulses) will be processed to yield decoded messages representative of the same value. Accordingly, use of this pulse-based communication protocol enables different processor-based devices to communicate with each other, and thus renders system 100 less susceptible to communication errors stemming from synchronization and timing problems.

Generally, the pre-determined time period during which received electrical pulses are deemed to belong to a particular message is set to a value corresponding to the longest pulse sequence that can be sent for any given message by the slowest device. In other words, the worst-case scenario for communicating messages is the time that it would take the slowest device to send the longest available message. For example, if the longest message that can be sent is thirty-two (32) electrical pulses, then the pre-determined time period used to receive and count pulses by any particular device should be at least the time period that it would take the slowest device to transmit these 32 electrical pulses.

Each of the slave devices 130, 132, 134, 136 and 138 includes a multi-position switch connected to a microprocessor. In the exemplary embodiment of system 100 the slave devices are defined as slaves, and thus they generally do not initiate communications; the microprocessors of the slave devices typically only respond to commands from the control device 110. Only one slave can communicate at a time. As will become apparent below, during normal operation, the slaves' microprocessors, when commanded, read the switch inputs and convert the switch position information to a simple uniform formatted message that is sent to and processed by the control device.

Particularly, a loosely timed strings of poises are transmitted. Timing of the individual pulses and their widths are not critical, only that they are received within a specified receiver time limit, which can be set tight or loose depending on the specifications of the system. As will be described in greater detail below, a pulse counter input register on the microprocessors is used to count the pulses communicated on the bus 120. This counter is incremented for every poise received via the interface (e.g., an input/output terminal of the microprocessor) connecting the microprocessors to the bus 120. In some embodiments, the counters are incremented upon detecting the rising or falling edges of the pulses using conventional pulse-detection techniques and implementations. The numeric count of the counters is then available for parsing and further processing by the microprocessors.

The maximum number of pulses defined in a transmission scheme can vary based on the design requirements, but generally is kept small so as to keep overall transmission times down. Commands and data are coded into numeric sub-ranges of the maximum pulse count, and a single transmission may carry both a command and the data associated with it as will be described below.

An exemplary embodiment of a pulse-based communication scheme, implemented using an exemplary system similar to the system 100, will next be described. In the exemplary system used to implement such a pulse-based communication scheme, a maximum of eight (8) slave devices may be interconnected to the system, with each slave device connected to a multi-position switch having a maximum of sixteen (16) positions relating to the values 0-15 (some switches may have fewer than sixteen positions). Each slave device is identified by a unique address corresponding to a value between 0-7 (since there are a maximum of eight devices in this particular embodiment). Further, in the exemplary embodiment of such a pulse-based communication scheme, the maximum pulse count value of 32 is decoded as the numeric value 31, and a transmission of a single pulse is decoded as the value '0'.

Initially the various devices interconnected to the bus 120 receive and decode a pulse train message that indicates the source of the transmission (i.e., the control device or one of the slave devices). The control device (e.g., device 110) transmits its commands to all the slave devices interconnected to the bus 120. These commands can be either global, where all slaves must perform the command, or address-specific, where only one slave responds to the command.

Exemplary message sub-ranges that may be employed by the pulse-based scheme are as follows:
 0-15: Slave data
 16-23 Master command with address
 24-31 Master command Global FIG. 8 is a table that summarizes the message values that may be used with the exemplary pulse-based scheme described herein.

As can be seen, in the above exemplary communication scheme, transmission by the control device has a decimal range of 16-31. Thus, in embodiments in which a transmitted message is encoded as a pulse sequences having at least seventeen pulses, the message will be deemed to have originated from the control device 110. More specifically, transmissions in the decimal range of 16-23 are transmission from the control device identifying a specific slave device according to the slave device's unique address. Transmissions in the decimal, range of 24-31 correspond to global commands intended to all the slave devices. In the exemplary pulse-based communication scheme described, herein, the control device sends one type of a global command, namely the global command requesting that the slave devices determine the current position of their respective multi-position switches. Accordingly, only one value from the range of 24-31 needs to be utilized in this described communication scheme. However, in some embodiments additional global commands, directed to all the slave devices, may be designed and used, thus using additional values in the decimal sub-range of 24-31.

In contrast, transmissions corresponding to decimal values in the range 0-15 will be deemed to be transmissions from slave devices. Thus, in embodiments in which the decimal value of a message is represented by a proportional number of pulses (e.g., the value '13' will be represented as a sequence of fourteen electrical pulses), transmissions having fewer than seventeen pulses will be deemed to have originated from one of the slave devices.

Because in the binary representation of values in the decimal range of 16-31, the fifth most significant bit is always set, devices interconnected to the bus 120 may differentiate between master communications and slave communications by determining if the fifth most-significant-bit (i.e., bit 4) of the pulse counter on each interconnected device used to count incoming pulses is set. If bit 4 of the pulse counter on a particular device is set, the particular device can recognize that the received communication is from the control device 110, and process the communication accordingly.

Thus, for example, the following binary representation of a pulse counter on any of the devices interconnected to the bus 120 would be decoded as a decimal value of 10, and therefore will be deemed to a communication transmitted from, one of the slave devices to the Control device 110.

| BIT7 | BIT6 | BIT5 | BIT4 | BIT3 | BIT2 | BIT1 | BIT0 |
|------|------|------|------|------|------|------|------|
|      |      |      | COMMAND | GLOBAL | ADDR2 | ADDR1 | ADDR0 |
| 0    | 0    | 0    | 0    | 1    | 0    | 1    | 0    |

In another example, the binary representation of the number of counted pulses in which BIT4 is set, but BIT3 is clear, the following would be interpreted as a command to addressed device 4 requesting that the device transmit its data.

| BIT7 | BIT6 | BIT5 | BIT4 | BIT3 | BIT2 | BIT1 | BIT0 |
|------|------|------|------|------|------|------|------|
|      |      |      | COMMAND | GLOBAL | ADDR2 | ADDR1 | ADDR0 |
|      |      |      | 1    | 0    | 1    | 0    | 0    |

In a further examples with both BIT4 and BIT3 set in the binary representation of the count value stored in a pulse counter, the following would be interpreted as a global command to all devices requesting that they acquire their switch position values.

| BIT7 | BIT6 | BIT5 | BIT4 | BIT3 | BIT2 | BIT1 | BIT0 |
|------|------|------|------|------|------|------|------|
|      |      |      | COMMAND | GLOBAL | ADDR2 | ADDR1 | ADDR0 |
|      |      |      | 1    | 1    | X    | X    | X    |

Because in the exemplary pulse-based communication scheme described herein only one global command is used, any value between 24 and 31 will be interpreted by the devices as the global command requiring the slave devices to read the current positions of the multi-position switches. Therefore, the values of the addresses bits (BIT0-BIT2) in the binary representation of the pulse count value are not important and are thus indicated by 'X's. However, in embodiments of pulse-based communication scheme in which the control device may transmit more than one type of global command, the value of at least some of the address bits may be required to decode the pulse count, value to determine which global command was transmitted.

Operation of exemplary pulse-based communication scheme proceeds as follows. Initially, at regularly set intervals (e.g., every 1 second), the control device 110 initiates a polling cycle of the slave devices to determine corresponding current, switch positions. The polling of the devices to determine their switch positions may be done at such intervals that avoid lengthy delays from the time a user has set a multi-position switch to a different switch position, to the time the load associated with that multi-position switch adapts to operate in accordance with the new switch position (e.g., the new power setting at which the load is to operate). The control device 110 thus initially transmits a global message requiring all the slave devices to read their current switch positions. As noted, in the exemplary pulse-based communication scheme, such a global command has a pulse count corresponding to a decimal value in the range of 24-31.

Subsequently, the various devices proceed to determine the current positions of their respective multi-position switches. While the devices are busy determining their current switch positions, the bus may be disabled to prevent errant communications that may upset the expected order of communications from the various devices. To disable the bus, the slave devices may respond to a global command by pulling down the data line 124 to its low state. This would signal to the control device that the slave(s) are busy. When any one slave has completed its operations to determine its corresponding switch position, it releases the line by letting its I/O pin turn to an input, and it can then monitor the state of the line. Until all slave devices have released the data line, the line it will remain low, signaling to all the other devices that have completed their tasks, and to the control device waiting for the slave tasks to be completed, that at least one of the devices interconnected to the bus is still busy. When the last device releases the line, the slave devices are now all monitoring the data line and are ready to receive another command or reply to the previous command (depending on what the command was).

Having determined the switch positions in response to a global command from the control device 110, ordered transmission of this data can now be commenced. To avoid bus contention between, the various slave devices, the slave devices generally do not respond to a global command but rather are individually prompted to send their data. Particularly, the control device 110 first sends an address message identifying slave device '0' (e.g., the slave device whose unique address is the value '0'). Slave device '0' subsequently transmits, in the next bus time slot, its current switch position in the form of a sequence of pulses representative of the switch position. The other devices, having decoded the address message sent by the control device 110 as identifying slave device '0' take no action. Subsequently, after the control device received the message from slave device '0', the control device 110 sends another address message identifying the next slave device (this time, slave device '1'). Slave device 1 then has control of the bus 120, and in the following bus interval sends its current switch position in the form of a sequence of pulses representative of its current, switch position. This sequence of address messages and response from the correspondingly identified slave devices is performed with respect to all the slave devices interconnected to the bus 120.

Thus, the order of communications sent on the bus 120 for one polling cycle of the slave devices 130, 132, 134, 136 and 138 of the system 100, can be represented by the following sequence of operations performed by the control device 110.
1. MASTER transmits global command to all attached devices to read current switch position;
2. MASTER waits a certain delay, and/or monitors the state of communication line, to make sure all the slaves have completed the task;
3. MASTER transmits addressed command to indicate to DEV0 to send current switch position hack;
4. MASTER awaits data from DEV0 and when received, decodes and stores it;
5. MASTER transmits addressed command to indicate to DEV1 to send current, switch position back;
6. MASTER awaits data from DEV1 and when received, decodes and stores it;
7. MASTER transmits addressed command to indicate to DEV2 to send current switch position back;
8. MASTER awaits data from DEV2 and when received, decodes and stores it;
9. MASTER transmits addressed command to indicate to DEV3 to send current switch position back;
10. MASTER awaits data from DEV3 and when received, decodes and stares it;
11. MASTER transmits addressed command to indicate to DEV4 to send current switch position back;
12. MASTER awaits data from DEV4 and when received, decodes and stores it; and
13. MASTER performs local processing.

In some embodiments, transmission of the value of '0' can be achieved by setting the pulse counters of the various devices to −1. Using this implementation., communications having one pulse will correspond to the value '0'. That, single-pulse communication, when received by the various interconnected devices, will cause the corresponding pulse counter to be incremented from −1 to 0, thus indicating that a communication corresponding to the value '0' has been received.

Because the pulse-based communication scheme operates without rigid adherence to synchronization and timing requirements and does not have to employ complex calibration routines to ensure accurate decoding of transmitted communications, in some embodiments simple RC circuits may be used to measure and control the duration length of the communications (also referred to as the "Pulse Envelope Delay"), in some embodiments, the time windows for the various communications may be measured by counting the number of clock pulses of the clocks used by the various microprocessors.

In some embodiments*, the system 100 and/or devices connected thereto, may be configured to operate in multi-burst transmission mode. In such a mode, the system may be configured to enable individual devices to transmit message sequences that include several messages, and thus enable the devices to efficiently transmit data corresponding to a larger range of values. For example, in situations where a device is to transmit data corresponding to a decimal value range of 0-255, the binary representation of the data to be transmitted is separated into two nibbles (e.g. the Most Significant nibble, corresponding to bit 4-7 of the binary representation, and the Least Significant nibble, corresponding to bits 0-3 of the representation). Subsequently, the decimal value of each of the nibble is determined, and two separate transmissions for the two nibbles, each having a number of electrical pulses corresponding to the decimal value of the associated nibble, are transmitted. At the receiving end, the binary representation for each of the received messages is determined, and the two resultant binary representations are concatenated to yield the binary representation of the original message. Thus, in these embodiments, an address command could be followed by multiple train pulse sequences from, a particular device rather than by a single train pulse sequence.

Because the slave devices interconnected to the system 100 may each be based on different microprocessors using different clock crystals, in circumstances where the processor clocks are used to measure the time windows of the communications, the corresponding number of clock pulses that substantially match to the time window used in relation to the system 100 will have to be determined for each of the individual microprocessors of the slave devices prior to the commencement of the operation of the system 100. In some embodiments, the timing requirements may be defined differently for the master device and for the slaves devices, depending on the capabilities of each.

For example, for a 4 MHz system clock used by the control device 110 with the ability to output a 500 Khz pulse train, the total time to transmit 32 pulses would be 64 μs. Assuming that 32 pulses represents the largest count needed to transmit messages by the control device, then under these circumstances the control device's equivalent baud rate would be 156 Kb. Assuming that 15% safety margin is added to the timing requirements, this safety margin would thus result in an equivalent baud rate of 147 Kb. Generally, slave devices only need to have a maximum pulse rate corresponding to half (½) of the control device's pulse rate (because, as noted, the maximum message length for any given device using the communication scheme described herein would be, for example, 16 pulses). The devices' timers are set to allow time to receive up to the maximum count, and should include sufficient padding to take into account the worst-case timing scenarios. The pulse width limits, duty cycle, rise times, and maximum frequency of the counter input should also be taken into account when designing the timing operability of the various devices, although generally these factors do not significantly affect the timing requirements of the devices of system 100.

Turning back to FIG. 1, as shown, the bus 120 is a 3-wire bus that includes common ground line 122 and common power line 126. The power line 126 is used to power the slave devices 130, 132, 134, 136 and 138 that are electrically coupled to it. In some embodiments, the power line 126 is set to a common voltage level of 5V. The bus 120 also includes the data line 124 on which pulse-based messages generated by the interconnected control unit 110 and the slave devices are communicated. To increase the bandwidth for communicating messages between the various devices interconnected to the bus 120 additional data lines may be added to the bus.

The system 100 includes the control device 110 which is a processor-based devices configured to transmit and receive sequences of electrical pulses, corresponding to messages, to and from one or more of the slave devices, determine the number of pulses it received in a particular time interval, and generate, based on the determined number of pulses, control signals to control the load devices connected to the control device 110.

The control device 110 may include any type of computer and/or processing device. For example, a suitable computing device to implement the control unit 110 is an 8-bit microcontroller device, such as a PIC12F675 microcontroller from Microchip Technology Inc. The processors used to implement the control device 110 can include volatile and non-volatile memory elements, and peripheral devices to enable input/output functionality. Such peripheral devices include, for example, a CD-ROM drive and/or floppy drive, or a network connection, for downloading software containing computer instructions. Such software can include instructions to enable general operation of the processor-based device, as well as implementation programs to transmit, receive and process sequences of electrical pulses as described herein, as well as to generate control signals, in response to received messages, to control load devices. The control device 110 may also include a digital signal processor (DSP) to perform some or all of the processing functions of the control device described herein.

Figure 2:
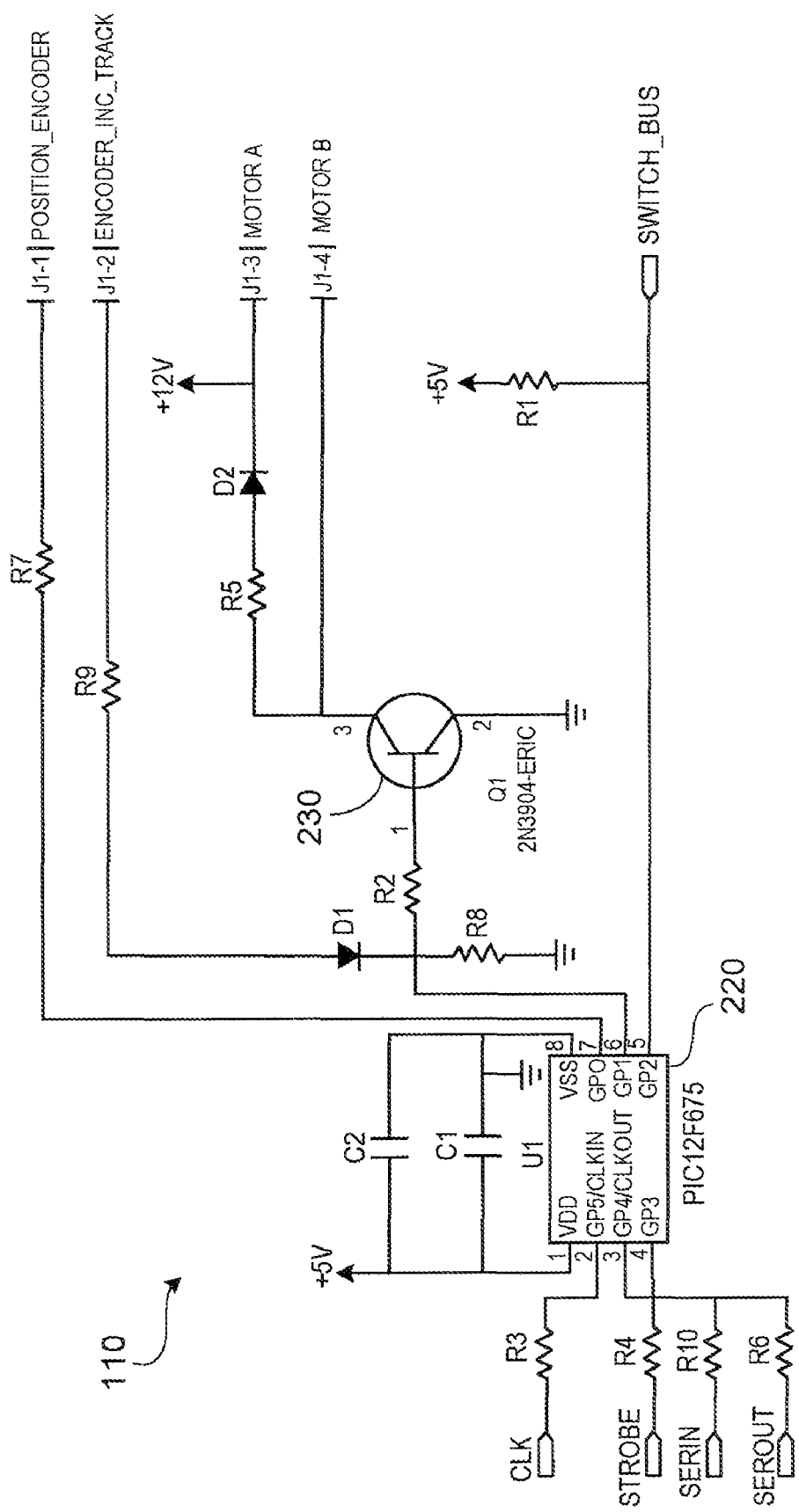
FIG. 2 is a circuit diagram of an exemplary embodiment of the master control device shown in FIG. 1.

With reference to FIG. 2, showing a circuit diagram of an exemplary embodiment of the control device 110, the control device 110 includes a microprocessor 220 such as an 8-bit processor PIC12F675. Pin 5 of the microprocessor 220, marked GP2, is an input/output connected to the bus 120 and enables bi-directional communication with the bus 120. Pin 5 of the microprocessor 220 thus serves as the interface of the control device 110 to the bus 120, and all communications to and from the control device 110 are directed through this pin. As further shown, power to the microprocessor 220 is delivered via pin 1 (marked VDD), and the microprocessor is grounded via pin 8 (marked VSS).

As noted, the microprocessor 220 of the control device 110 generates control signal to control one or more load devices based on the received messages from the slave devices that are representative, for example, of the switch positions of their respective multi-position switches. As shown, pins 6 and 7 of the microprocessor 220 (marked GP1 and GP0, respectively) are driven according to the generated control signals. For example, the control signals may be used drive a transistor 230 to regulate the operation of a motor (e.g., a washing machine motor). Pins 3 and 4 of the microprocessor 220 enable communication with another device (e.g., a washing machine appliance connected to some remote server to send or receive data).

Figure 3:
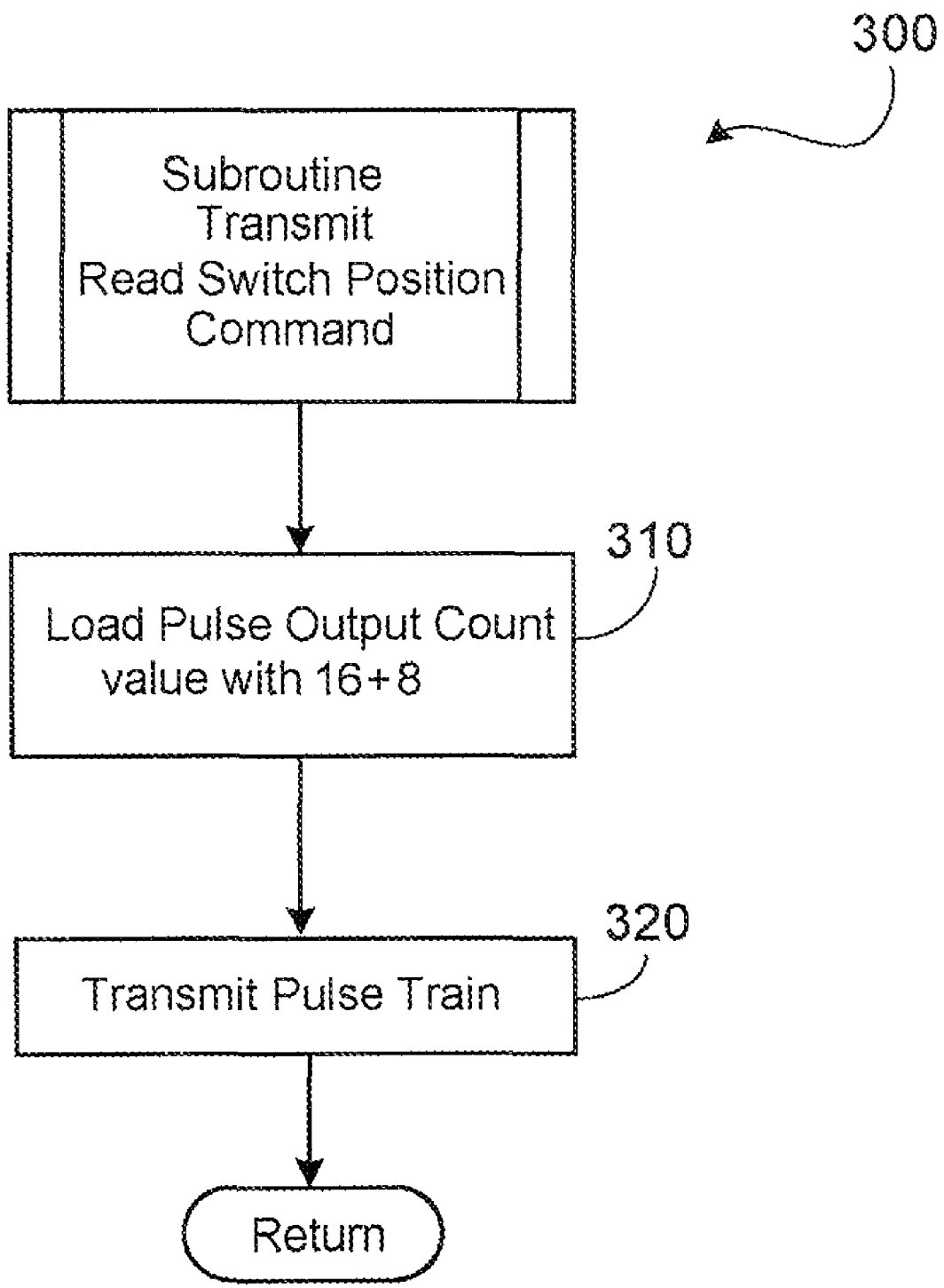
FIG. 3 is a flowchart of an exemplary procedure for sending a global "Read Switch Position" command to the slave devices.

The control device 110 initiates a poll cycle at regular interval to receive messages corresponding to current positions of the multi-positions switches connected to the respective slave devices. FIG. 3 is a flowchart of an exemplary embodiment of a procedure 308 for sending the global "Read Switch Position" command to the slave devices 130, 132, 134, 136 and 138. As shown, at 310 the control device sets the output pulse-counter to a value of 24, which is the value corresponding to the "Read Switch Position" global command in the exemplary pulse-based communication scheme described herein. The output pulse counter may be one of the general, purpose registers ox the microprocessor. Furthermore, the output pulse-counter may be the same counter also used, to count input pulses received through the input/output data pin (e.g., pin 5 of microprocessor 220).

Having loaded the output pulse-counter with, the value corresponding to the "Read Switch Position" global command, the control device transmits, at 320, a pulse train whose number of electrical pulses corresponds to the value stored in the output pulse-counter. Thus, in the exemplary pulse-based communication scheme, in which the value '0' is represented as a single electrical pulse, the pulse train for the "Read Switch Position" global command may include 25 electrical pulse to represent the value 24 stored in the counter. Subsequently, the slave devices interconnected to the bus 120 will all receive the global command, and in response will perform a read operation of their respective multi-position switches to determine the current positions of the those switches.

Figure 4:
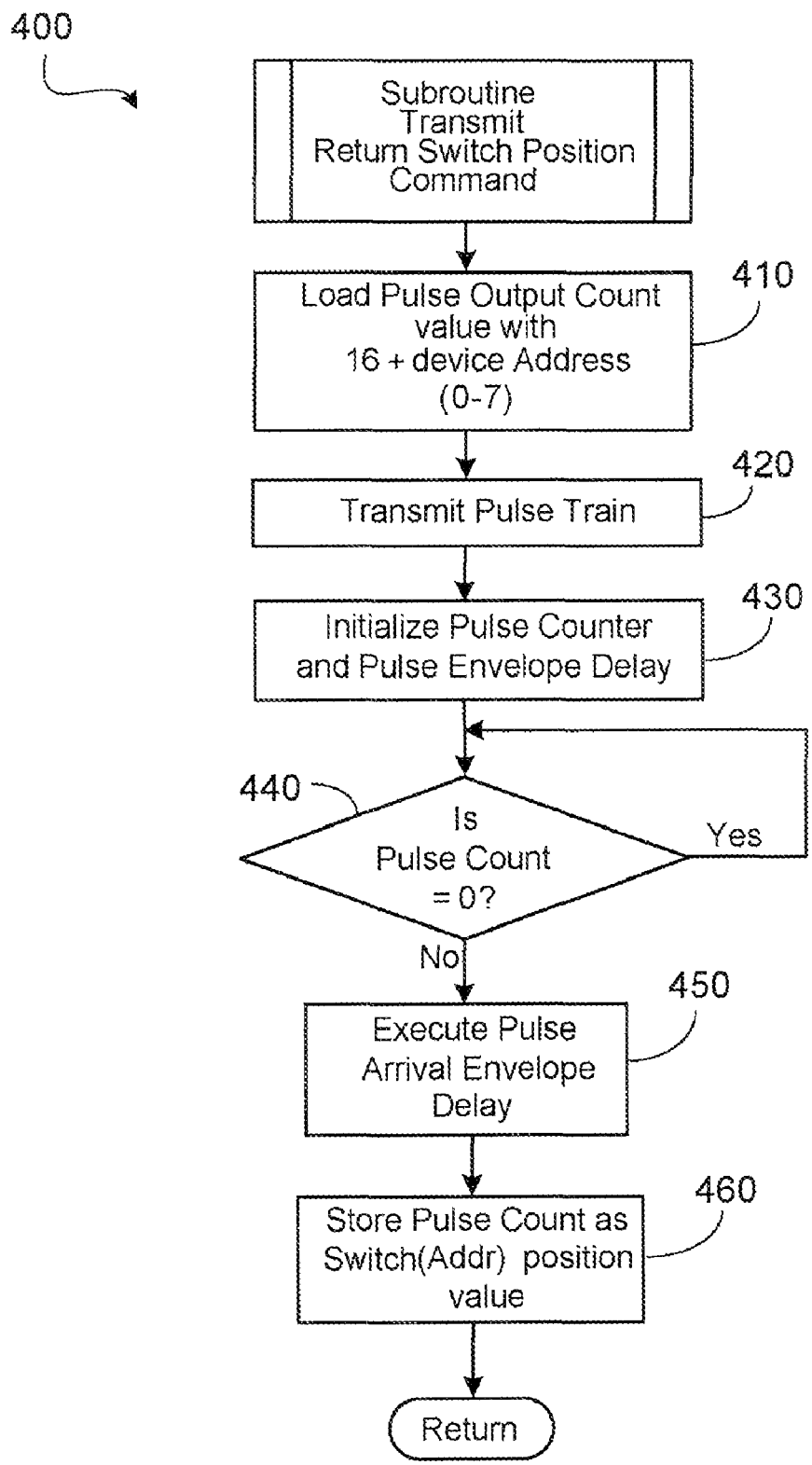
FIG. 4 is a flowchart of an exemplary procedure for requesting a specified slave device to send the switch position data and processing the response message received from the specified slave device.

FIG. 4 is a flowchart of an exemplary embodiment of a procedure 400 for requesting a specified slave device to send its switch position data, and for processing the response message received from the specified slave device. Once the global "Read Switch Position" command had been transmitted to the slave device by performing, for example, procedure 300, and after the slave devices are all ready to send the data, the control device sets, at 410, the output pulse-counter of the control device 110 to a value equal to the sum of 16 and the address identity of the particular slave device from which switch position data is to be received. Thus, for example, to send an address message to device 1 (i.e., to signal to that device to send its switch-position data), the pulse-counter of the control device 110 is loaded with a value equal to 16+1=17.

Having loaded the output pulse-counter with the value corresponding to the address of the particular target device whose switch position data is to be read, the control device 110 transmits, at 420, a pulse train whose number of electrical pulses corresponds to the value stored in the output pulse-counter. Thus, if slave device 1 is identified as the next target device to send its switch-position data, then a pulse train with 18 pulses (corresponding to the decimal value 17) is communicated by control device 110. The address message identifying, for example, device 1 is received by all the slave devices. However, as will be explained in greater detail below, once the slave devices decode and determine that slave device 1 has been identified by the control device 110, only slave device 1 will respond by placing its switch-position data, formatted as a pulse train, on the bus 120 for receipt by the control device 110. In some embodiments, just prior to transmitting the pulse train, the microprocessor 220 changes the port pin 5 to operate in output mode to enable pin 5 to transmit, signals through the pin. After completing the transmission of the pulse train, the port pin 5 is set back to input, mode, and the control device 110 waits to receive data from the specified slave device.

The control device next initialized, at 430, the input pulse counter so that it is ready to count received input pulses transmitted on the bus from the slave device specified by the address message. The input pulse-counter is set to a value of '−1' (thus enabling data messages with a value of '0' to be represented by a pulse train with a single electrical pulse), in some embodiments, the input pulse counter may be the same hardware component (e.g., a microprocessor general purpose register) used by the output pulse-counter to transmit global commands and/or address message identifying slave devices. In some embodiments, the processors of the slave devices may include dedicated pulse counters configured to automatically count pulses received via one or more of the input/ output pins of the processor, thus foregoing the need to use a general purpose register to count pulses.

Also at 430, the Pulse Envelope delay timer is initialized. Particularly, and as noted, electrical pulses communicated within a bus time interval having a predetermined period are considered to belong to a single message. Thus, to communicate and decode messages it is necessary to track the beginning and end of individual time intervals. This time interval, referred to as the pulse envelope delay, is the interval that follows the arrival of the first pulse of a new message. As also noted, the pulse delay envelope is chosen so that it is long enough to encompass the worse-case scenario (time-wise) for received pulses belonging to a single message. All pulses received prior to the expiration of this pre-determined time period will thus be deemed to be associated with a single message sent by one of the devices coupled to the bus 120. Once that interval expires, any pulse received thereafter would be deemed to be associated with a different message. To measure the pulse delay envelope, a general purpose register used as a timer is incremented in response to, for example, the rising edges of the cycles of the microprocessor's internal clock, or in response to the rising edges of the external clock coupled to pin 3 of microprocessor 220. Accordingly, the timer register is initialized to 0. in some embodiments, the microprocessor 220 of the control device 110 may include dedicated timers configured to automatically measure time as indicated by the cycles of the clock coupled to the processor, thus foregoing the need to use a general purpose register to measure the pulse envelope delay.

The pulse envelope delay having been initialized, the control device waits, at 440, for the arrival of the pulse (thus signaling the beginning of a new message present on the bus 120). Specifically, the Pulse Count, or register used to count received pulses, is read to determine if its value is −1. If it is, indicating that the first pulse is yet to arrive via the bus 120, the reading operation of the input pulse-counter is repeated.

Once the first pulse has arrived, the timer measuring expiration of the Pulse Envelope Delay is started at 450. While the pulse delay envelope has not expired, pulses received via the data line 124 of the bus 120 cause the input pulse counter of the control device 110 to be incremented.

Once the pulse delay envelope has expired (i.e., the time interval associated with the current message being communicated has elapsed), as may be determined, by repeated checks of the timer (that operation not shown in FIG. 4) or, in some cases, by an internal interrupt that is asserted when the timer expires, the value of the input pulse counter is stored, at 460, at a memory element (e.g., a general, purpose register, memory location on a volatile memory module of the processor 220, etc.) corresponding to the slave device that sent the data message representative of the switch position of the multi-position switch of the slave device.

Subsequently, if there are additional slave devices that have to communicate their switch position data, procedure 400 is repeated to specify those remaining slave devices by transmitting appropriate address message, and receiving in response data from the specified slave device.

Once switch position data has been, received by the control device 110, control signals to control the load devices may be generated.

In some embodiments, the control device 110 generates control signals using look-up tables that are stored in a memory module (not shown) of the processor 220. For a particular switch, position received from a particular slave device, the look-up table for that slave device is accessed, and the entry corresponding to the communicated switch position is read. Based on the values read from the look-up table, the control device 110 generates a control signal that is communicated to the one or more load devices (e.g., motor) in accordance with the received message from the slave devices.

Turning back to FIG. 1, the slave devices 130, 132, 134, 136 and 138 each includes a multi-position switch configured to be placed in a plurality of positions (e.g., 2 positions, 6 positions, 12 positions, etc.), and a processor-based device coupled to the multi-position switch. Descriptions of exemplary embodiments of multi-position switches that may be used with system 100 are provided, for example, in U.S. Pat. No. 6,951,997, entitled "Control of a Cooktop Heating Element," and U.S. patent application Ser. No. 11/548,396, entitled "Power Control Module for Electrical Appliances" and filed Oct. 11, 2006, the contents of which are hereby incorporated by reference in their entirety.

With reference to FIGS. 5A-E, in some embodiments, the multi-position switch 500 includes a rotateable shaft 510 secured inside a housing 520. The shaft 510 has an end 512 that is configured to be received within a user-rotateable knob (not shown). Application of force by a user to rotate the knob causes the shaft 510 to rotate. The other end (not shown) of the shaft 510 rests within an open-ended hollow cylinder 524 extending from a base 522 of the housing 520 (see FIG. 5B).

Figure 5A:
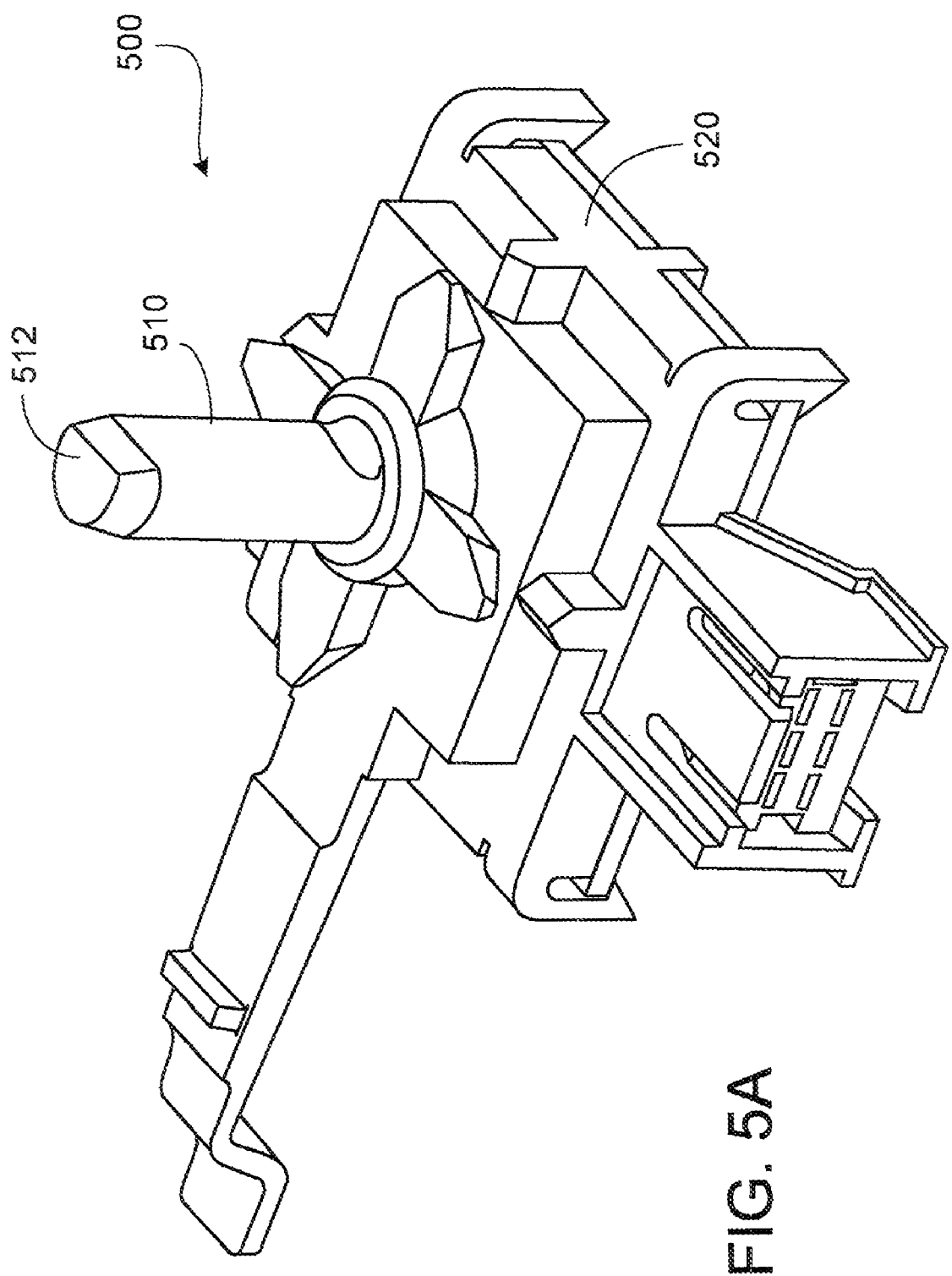
FIG. 5A is a perspective view of an exemplary embodiment of the shaft-based multi-position switch.
Figure 5B:
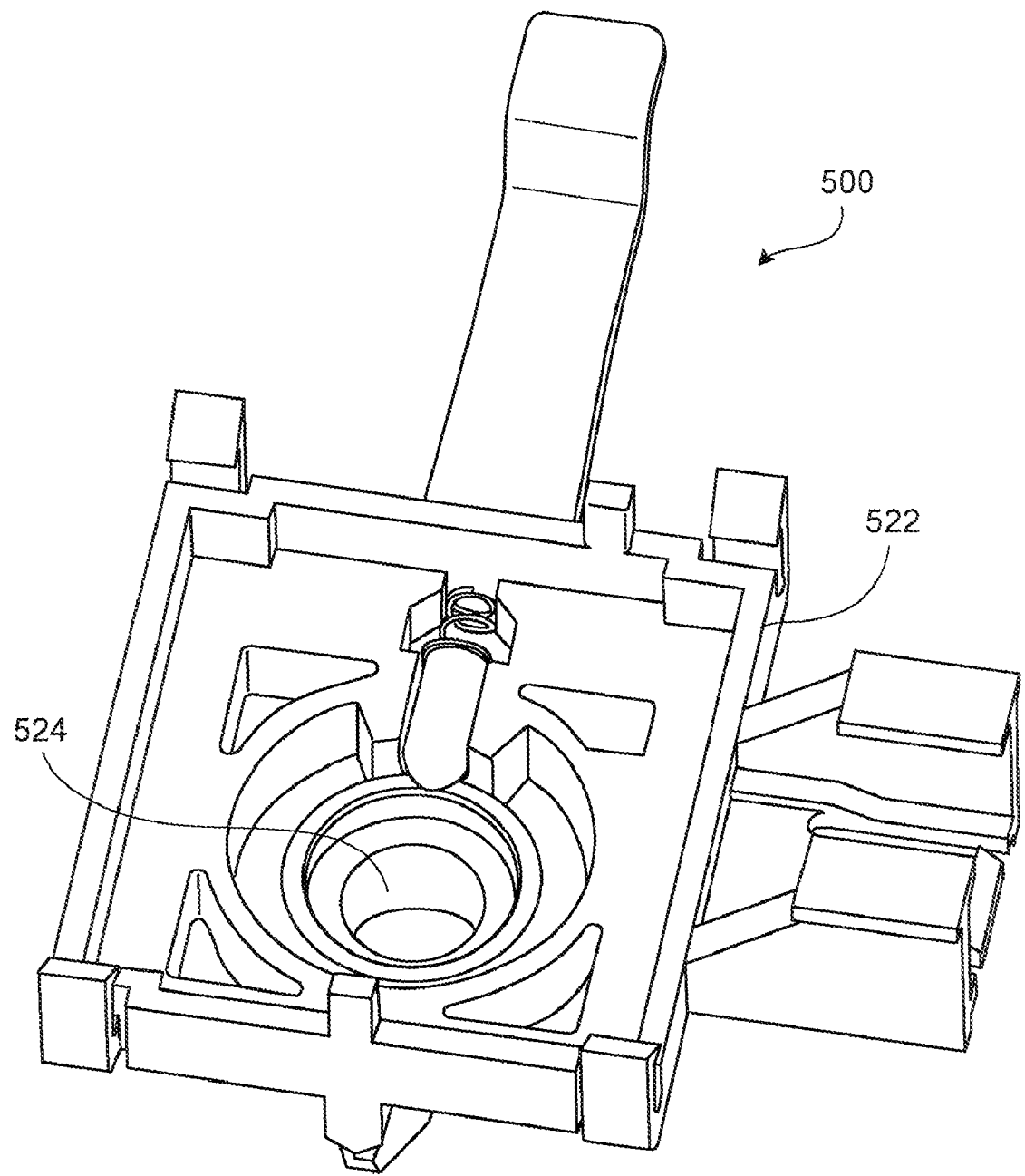
FIG. 5B is a perspective view of a base of the housing of the multi-position switch of FIG. 5A.
Figure 5C:
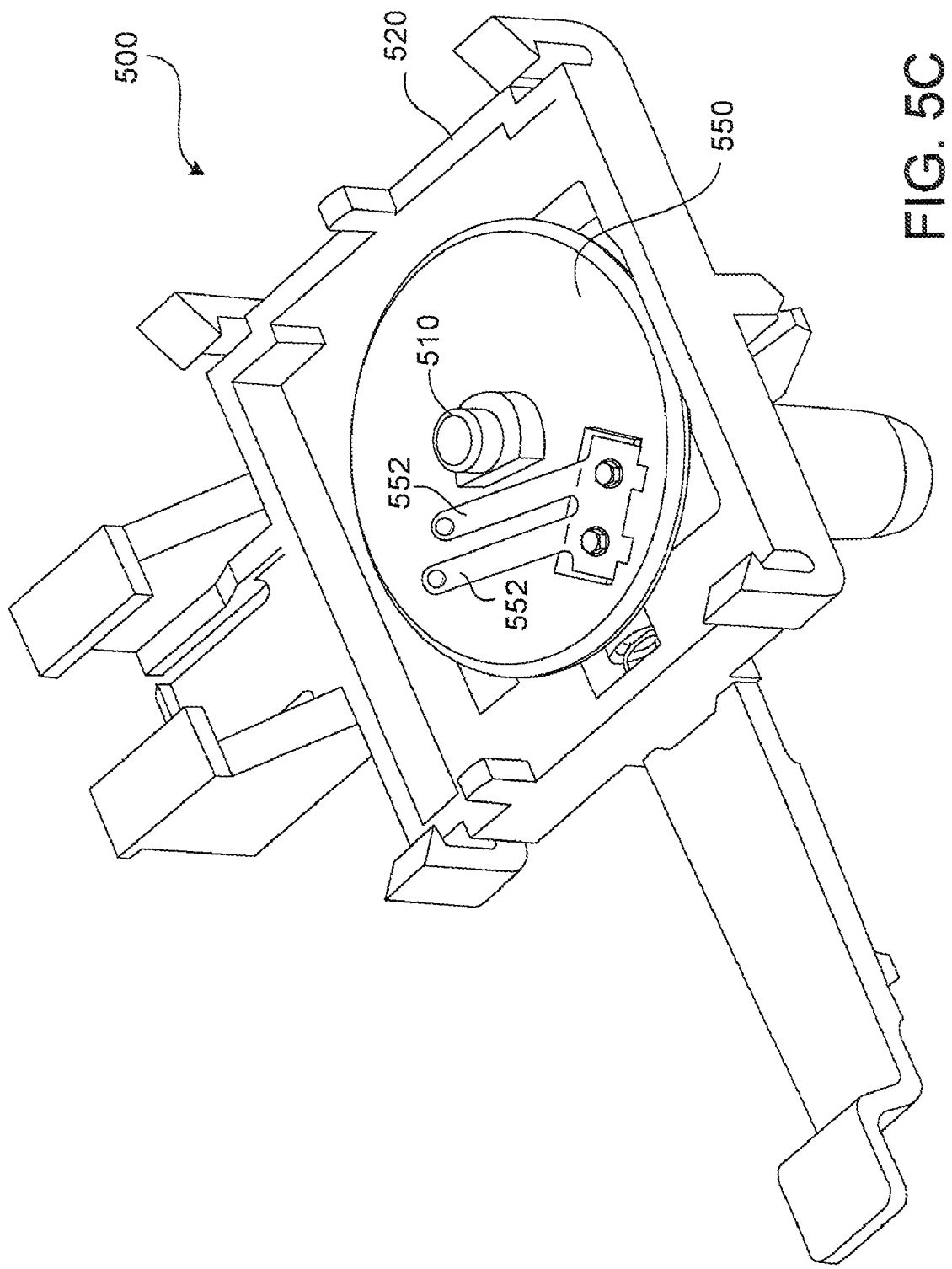
FIG. 5C is a perspective view of a rotateable disk and metal wipers disposed inside the base of the housing of the multi-position switch

With reference to FIG. 5C, an annular rotator disk 550 is secured to the shaft 510, and is configured to be rotated to a number of positions in response to rotation of the shaft 510. Thus, movement, of the shaft 510 to a particular rotational position will result in a corresponding change of the rotational position of the rotator disk 550. The particular position of the rotator disk 550 causes a switch position signal to be generated by an encoder circuit that determines the current position of the rotator disk 550.

Figure 5D:
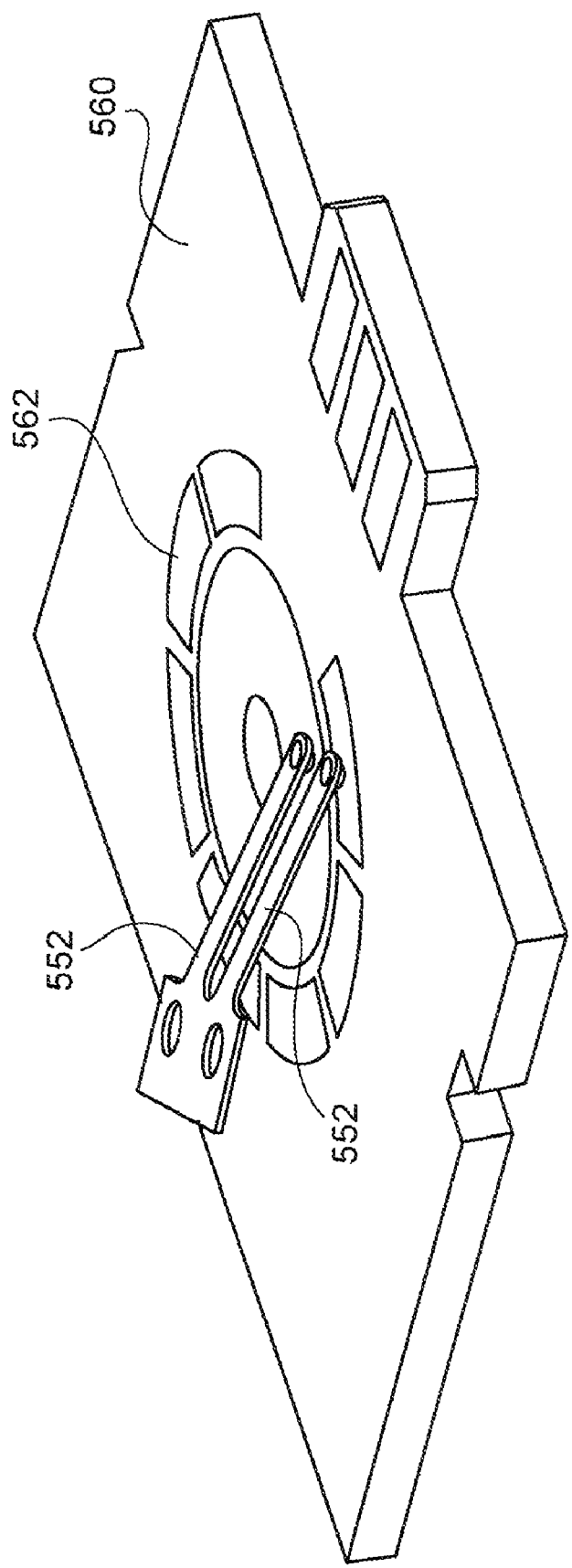
FIG. 5D is an inverted view of a circuit hoard and the metal wipers shown in FIG. 5C.
Figure 5E:
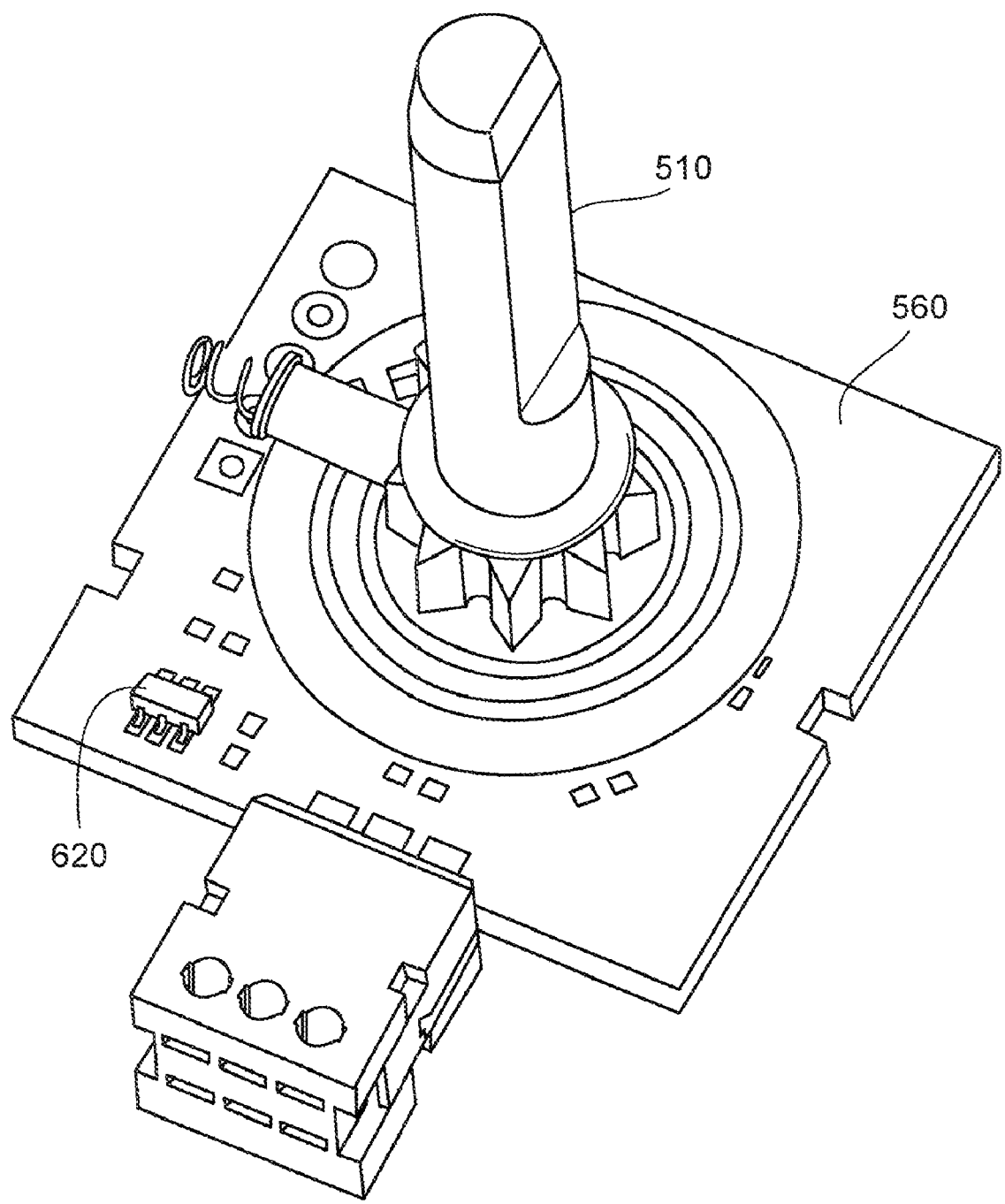
FIG. 5E is a perspective view of the circuit, hoard onto which the multi-position switch and a microprocessor chip are mounted.

Particularly, to generate the switch position signal, in some embodiments the encoder circuit is implemented as a resistance-based analog encoder configured to generate a switch position signal indicative of the rotational position of the rotator disk 550. As shown, the rotator disk 550 includes metal wipers 552 that are affixed to the top surface of the rotator 550. Thus, with, reference to FIG. 5D, showing an inverted view of a circuit board 560, the metal wipers 552 face the surface of the circuit board 560, and arc disposed below an encoder trace 562 that is divided into multiple segments. The generated switch position signal is processed by a microprocessor 620, as more particularly described below. As shown in FIG. 5E, in some embodiments the microprocessor 620 is affixed to the circuit board 560.

Figure 6:
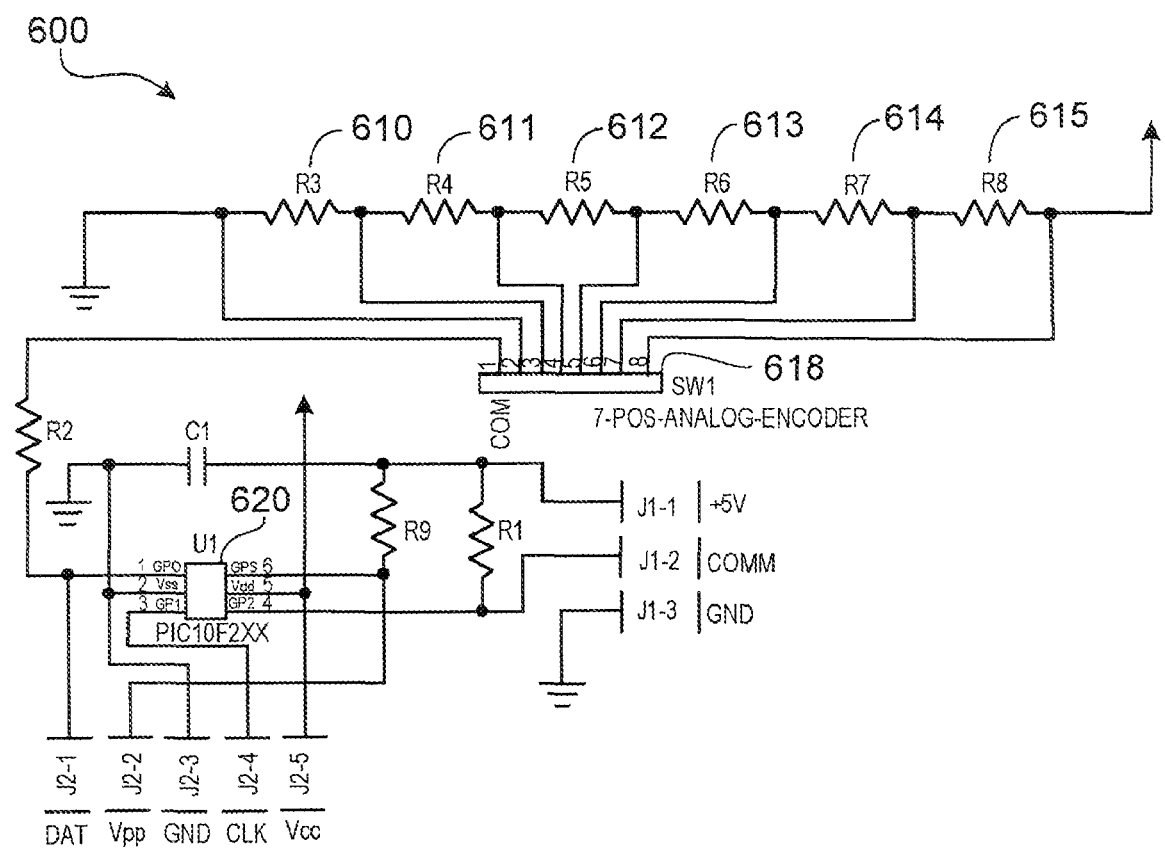
FIG. 6 is circuit diagram of an exemplary embodiment of part of the processor-based, circuit of any of the slave devices shown in FIG. 1.

With reference to FIG. 6, a schematic diagram is shown of an exemplary embodiment of part of the electrical circuitry 600 of one or more of the slave devices 130, 132, 134, 136 and 138. As shown, the circuitry 600 of a slave device includes an arrangement of resistors 610-615 for a resistor divider network that are electrically coupled to the multiple segments of the encoder trace 562 of the multiple-position switch 500 such that the junction of two resistors in the arrangement is electrically coupled to one of the encoder trace segments, in some embodiments the resistive element coupled to the encoder circuit may be a variable resistor (e.g., a potentiometer) that is used to provide the variable, resistance required to implement the encoder circuit. In some embodiments, the encoder circuit may include multiple binary elements, each having its own input to the microprocessor. This multi-bit input directly generates a binary digital value that is related to the switch position. For slave devices whose corresponding multi-position switch is adapted, to be rotateably moved to additional positions, the encoder may be configured to encode those additional positions of the multi-switch position.

When the shaft 510 is rotated, the wipers 552 affixed to the rotator disk 550 also rotate such that at least one wiper is electrically coupled to common terminal 1 of a switch box 618 and another wiper is electrically coupled (via the encoder trace 502) to one of the terminals 2-8 of the switch box 618. An electrical connection between common terminal 1 and one of the other terminals of the switch, box 618 is therefore formed. The particular terminal with which the wiper come in contact depends on the particular position of the multi-position switch 500. Consequently, the voltage level at common terminal 1 will depend on the switch, position of the multi-position switch 500, and thus the voltage level applied at pin 1 of the microprocessor 620 will likewise depend on the particular switch position of the multi-position switch 500.

In some embodiments the encoder circuit can be implemented as either an absolute or a relative rotary encoder. In some embodiments, a digital encoder may be used.

As noted, the slave device 130, 132, 134, 136 and 138 each include a processor, such as microprocessor 620, or computing device, configured to receive and transmit pulse-based communication as described herein. For example, as shown in FIG. 6, a suitable processor device to use with a slave device is a 6-pin microcontroller device, such as a PIC10F2XX microcontroller from Microchip Technology Inc. In some embodiments, the processors of the slave devices may also include digital signal processors (DSP) to perform some or all of the processing functions of the slave device.

As further shown in FIG. 6, the switch position signals, generated by the analog encoder coupled to the multi-position switch 500, are received by pin 1. In some embodiments, pin 1 of the microprocessor 620 is coupled to an analog-to-digital converter, which, converts the analog voltage level applied at pin 1 to a corresponding digital value that can subsequently be processed by the microprocessor 620. That digitized voltage level can then be used to determine the corresponding switch position by using, for example, a look-up table that relates received voltage levels, to their corresponding switch positions. The processor 620 uses that signal to generate a message corresponding to the switch position. The resultant message generated by the processor 620 is transmitted to the control device 110 via the bus 120 that is electrically coupled to the data pin of the processor 620 (pin 4 on PIC10F2XX microcontrollers). The processor's data, pin is used as both an input terminal to receive data from the control device 110, as well as for outputting messages onto the bus 120.

To transmit messages, the I/O port is set to output mode, and the output level is set low, thus driving the output of the port to low against the pull-up resistor coupled to the port. To transmit a pulse, the I/O port is set to input mode, thus enabling the pull-up resistor to pull the data line of the bus to a high. Pulses are thus transmitted, in this implementation, by setting the I/O port to output mode to cause the bus data line to go low, and then, releasing the line by setting the I/O port to input mode. When, the transmission is completed, the I/O port will be left in input mode.

Alternatively, in some embodiments, transmission of pulses is performed by first setting the I/O port to output mode, and then transmitting poises by setting the port to high or low voltage levels. When the transmission, is completed, the I/O port is switched hack to input mode.

In some embodiments, two different pins may be used for input/output operation, with one pin exclusively dedicated to receive inputs from the bus 120, and the other pin exclusively dedicated to transmit outputs.

Processor 620 further includes power and ground pin that are respectively coupled to bus lines 126 and 124.

The processors used to implement the slave devices may each include volatile and non-volatile memory elements, and peripheral devices to enable input/output functionality. Such peripheral devices include, for example, a CD-ROM drive and/or floppy drive, or a network connection, for downloading software containing computer instructions. Such software can include instructions to enable general operation of the processor-based device. Such software can also include implementation programs to receive sequences of electrical pulses in a time interval having a predetermined period, determine the number of pulses, and based on the determined number of pulses, transmit sequences of electrical pulses representative, for example, of the current position of a multi-position switch. The processors of the slave devices may also include a digital signal processor (DSP) to perform some or all of the processing functions described herein.

In some embodiments, me processors of at least some of the slave devices may be coupled, electrically and/or mechanically, to some other type of device (e.g., a measuring instrument), under which circumstances the processors of those slave device may communicate data pertaining to characteristics of that, other type of devices. In some embodiments, the processors of at least some of the slave devices may not be connected to any other device. Accordingly, the pulse-based communication procedure may be used in relation to any system, that includes a plurality of interconnected devices adapted to transmit and receive electrical pulses.

Figure 7:
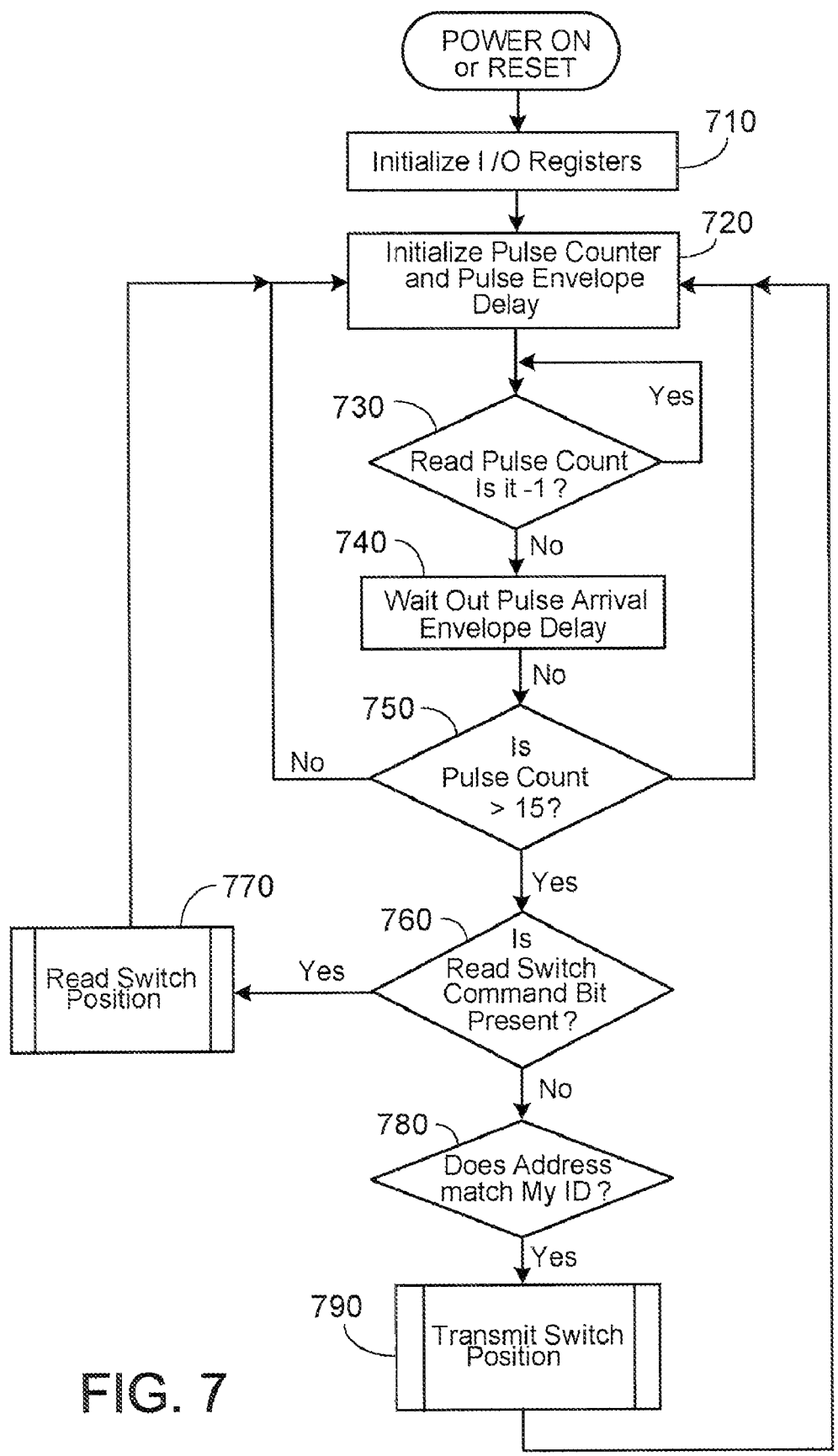
FIG. 7 is a flowchart of an exemplary procedure performed by any of the slave devices of FIG. 1 to process and respond to requests from the control device shown in FIG. 1.

FIG. 7 is a flowchart of an exemplary embodiment of a procedure 700 performed by any one of the slave devices 130, 132, 134, 136 and 138 to process and respond, to requests from the control device 110. Particularly, upon powering-on or resetting of the slave devices, the I/O registers of the slave devices' processor are initialised at 710. Of the initialized registers, one general purpose register of the processors of the slave devices is generally used to count pulses present on the data line 124 of the bus 120. Because a single pulse is used to represent die value '0', in some embodiments the pulse counter is initialized to '–1' (at 720). In some embodiments, the processors of the slave devices may include dedicated pulse counters configured to automatically count pulses received via one or more of the input/output pins of the processor, thus foregoing the need to use s general purpose register to count pulses.

Another general purpose register of the slave devices' microprocessors is used as a timer to measure the pulse delay envelope (i.e., track the time elapsed from the beginning of the arrival of the first pulse to determine if the pre-determined time period for the current message interval has elapsed). All pulses received from the bus 120 prior to the expiration, of this predetermined time period will be deemed to be associated with a single message sent over the bus 120. Once that interval expires, any pulse received thereafter would be deemed to be associated with a different message. As with the microprocessor 220 of the control device 110, in some embodiments, the pulse delay envelope is measured by using a general purpose register used as a timer that is incremented in response to, for example, the rising edges of the cycles of an internal or external clock of the microprocessor 620. Thus, at 720, a register used as timer is set to 0. In some embodiments, the slave devices' processors may include dedicated timers configured to automatically measure time as indicated, for example, by the cycles of the clock coupled to the processor, thus foregoing the need to use a general purpose register to measure the pulse envelope delay.

The slave devices wait, at 730, for the arrival of the first pulse (thus signaling the beginning of a new message present on the bus 120). Specifically, the Pulse Count, or register used to count received pulses, is read to determine if its value is −1. If it is indicating that no new pulse has yet arrived via the bus 120, the reading operation of the pulse counter is repeated.

Once the first pulse had arrived, the timer measuring expiration of the pulse envelope delay is started. While the pulse delay envelope has not expired, as determined at 740, pulses received via the data line 124 of the bus 120 cause the pulse counter to be incremented. Once the pulse delay envelope has expired (i.e., the time interval associated with the current message being communicated on the bus 120 has elapsed), the pulse counter is read again and a determination is made at 750 whether the pulse count exceed a value of 15. As noted, in the exemplar embodiment of the system 100, messages whose decimal value exceeds 15 are associated with commands sent by the control device 110. On the other hand, messages whose corresponding number of pulses is between 0-15 correspond to messages sent by one of slave devices. As further noted, in the exemplary embodiments of system 100, messages sent by the slave device correspond to the current switch positions of the multi-switch positions of the respective slave devices sending the messages. Accordingly, if it is determined at 750 that the number of pulses received with respect to the current message is less than, or equal to 15, then the just received message corresponds to a switch positions sent by one of the slave device, and is therefore not a command sent by the control device to one or more of the slave devices. Accordingly, the current message is ignored by the other slave devices. Under these circumstances, the slave devices prepare to receive and process the next message (i.e., sequence of pulses) communicated on the bus 120, and repeat the operations at 720-740 in relation to the next message.

If it is determined at 750 that the value of the pulse counter exceeds 15, then the slave devices processing the message determine at 760 whether the Read Switch Command bit is set by determining, for example, if the pulse counter value matches or exceeds a value of 24. As noted, in the exemplary embodiment of system 100, polling of the slave devices for their current switch positions is achieved by sending a global message corresponding to a value between 24-31, which, is representative of a global command requiring all the slave devices to read the current switch positions of their respective multi-position switches.

Thus, if the received message includes more than 24 poises (and thus, the Read Switch Position bit is set), then the slave devices determine the current switch position at 770 (generally, any pulse count higher than 24 will be deemed to correspond to the global read message.) Determination of the switch, position of devices' respective multi-position switches is performed by receiving via pin 1 of processor 620 (for devices that use PIC10F2XX processors) the switch position signal from the encoder of the slave devices. Once the corresponding switch position is determined from the switch position signal, a representative value may be stored in a register of the processor 620 for subsequent processing. For example, a value of 11 may be stored in a register of processor 620 to represent that the multi-position switch 500 has been moved to its 11$^{th}$ position.

If the read switch command bit is not present (i.e., fewer than 24 pulse, but more than 16 pulses were received and counted during the just expired bus interval), then the message received by the slave devices corresponds to an address message identifying one of the slave devices as the next slave device that is to transmit a message representative of the current position of the device's multi-position switch. Accordingly, at 780 the slave devices (all of which received the message) determine if the number of pulses counted matches their respective device addresses. For those slave devices whose corresponding device address does not match the just received address message, the devices ignore the current message, and prepare to receive and process the next message, in accordance with the operations of procedure 700.

On the other hand, the slave device whose device address matches the received address message transmits, at 790, its current switch position, as determined at 770 in an earlier iteration in which an earlier global read command message was received and processed, to the control device 110. Transmission of the current switch position of the device's multi-position switch is performed by transmitting a pulse train whose number of pulses corresponds to the number representing the current, position of the multi-position switch 500. Thus, if the value representing the current position of the multi-position is 11 (that value having been stored in, for example, a register of the processor 620), the transmitted pulse train from the slave device includes, in some embodiments, twelve (12) electrical pulses.

In some embodiments, at least some of the slave devices of system 100 may be configured to perform some local operation on the slave device in response to messages received via the bus 120 (i.e., operations other than transmitting data to the control device or some other device). For example, in some embodiments, at least some of the slave devices may be coupled to a display device (e.g., a 7-segment LED digital display). In some embodiments, those slave devices initially receive a global command signaling that data to be displayed will be sent by the control device. The global command may be formed as a pulse train having, for example, between 24-31 electrical pulses. The slave device would then determine the number of received pulses and use a look-up table to identify the particular command received. For example, a command having 24 pulses may signal a request for the device to read the switch position of a corresponding attached multi-switch position, whereas a command having, for example, 25 pulses may signal that display data is to be sent by the control device 110. If a device receiving such a global command does not have display capabilities, the command would be ignored. Subsequently, the slave devices would receive address commands identifying the specific slave device affected by the global command (in this case a "display" command). Having identified the specific device to display data, the actual data to be displayed is communicated on the bus 120, and the processor 620 of the specified slave device processes the data and causes the coupled display device to display the appropriate information (the display information need not be the actual value sent by the control device 110, but could be some value determined by the slave device using, for example, a lookup table).

As described, to enable transmission and receipt of data corresponding to a large range of values, the devices of system 100 may be configured to operate in multi-burse transmission mode. Thus, if a device is to display values in the range of 0-255, the transmitting device (e.g., the control device 110) could transmit a burst of multi-pulse messages, with each message representing a different portion of the binary representation of the data being transmitted. Thus, for example, in such embodiments, a global command may first be sent by the control device 110, signaling that display data is to be transmitted. Next, an address message identifying the target device is transmitted, followed by multi-burst transmission carrying the data to be displayed by the target slave device. Breaking up data into smaller pieces for transmissions formatted as pulse-trains thus enables large-value numbers to be transmitted.

In some embodiments, at least some of the devices 130, 132, 134, 136 and 138 can also transmit control commands to one or more of the devices interconnected to bus 120 and thus operate in a manner similar to control device 110.

Other types of operations may be performed by the slave devices in response to different commands sent by the control device.

Other Embodiments

The methods and systems described herein are not limited to a particular hardware or software configuration, and may find applicability in many computing or processing environments. The methods and systems can be implemented in hardware, or a combination of hardware and software, and/or can be implemented from commercially available modules applications and devices.

For example, in some embodiments, a hardware-based receiver/transmitter, configured to handle the reception and transmission of pulse trains, may be implemented as an integrated chip (IC) that operates independently of a microprocessor. In some embodiments, such an IC could be used in conjunction with a microprocessor. In IC-based implementations, the hardware could detect the first incoming pulse and measure its duration length. This initial pulse length timing could then be used as the basis for calculating a timeout for the next pulse(s). When it is determined that no pulse has been received during, the timeout period, the device could indicate that the received pulse count is finalized and ready to be processed by setting or resetting an output pin (in circumstances where a microprocessor is used in the implementation, an indication that the pulse count is finalized and ready to be processed can be performed by setting an internal, flag or by generating an interrupt signal internal, to the microprocessor). Command decoding and address resolution procedures could similarly be performed.

To transmit a pulse using the IC-based implementation, an output register could be loaded and the pulses train would be automatically generated at the desired rate (set by programmable configuration registers). An interrupt could be triggered or a flag set upon completion of the pulse-train transmission.

Where the implementation of the systems and methods described herein is at least partly based on use of microprocessors, the methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) can be implemented using one or more high level procedural or object-oriented programming languages to communicate with a computer system: however, the program(s) can be implemented in assembly or machine language, if desired. Additionally, applications for execution on the different devices of system 100 may implemented using different software implementations. The language can be compiled or interpreted. The device(s) or computer systems that integrate with the processor can include, for example, a personal computer(s), workstation (e.g., Sun, HP), personal digital assistant (PDA), handheld device such as cellular telephone, laptop, handheld, or another device capable of being integrated with a processors) that can operate as provided herein. Accordingly, the devices provided herein are not exhaustive and are provided for illustration and not limitation.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

A number of embodiments of the invention have been described. Nevertheless, it will be understood that various modifications may be made without departing from the spirit and scope of the invention. Accordingly, other embodiments are within the scope of the following claims.

What is claimed is:

1. A method for communicating data in an appliance, the method comprising:

providing a multi-position switch having a rotatable shaft extending through a housing, the shaft having a first end outside the housing configured to receive a user rotatable knob and a second end inside the housing and communicating with electrical contacts providing a signal indicating a rotated position of the shaft, the housing further containing a first electrical circuit communicating with the electrical contacts to provide a sequence of electrical pulses during an interval having a pre-determined time period in which the number of electrical pulses indicates a position of the rotatable shaft;

receiving at a second electrical circuit via a wiring harness having only a single ground referenced data conductor, at an appliance controller controlling electrical loads of the appliance, the sequence of electrical pulses during the interval having a pre-determined time period as determined from a timer contained at the second electrical circuit, the sequence of electrical pulses representing a message from the multi-position switch, the second electrical circuit operating to:

determine the number of received electrical pulses in the sequence of electrical pulses; and decode the message based on the determined number of electrical pulses received during the interval in order to control at least one electrical load of the appliance.

2. The method of claim 1, further comprising transmitting an address message from the second electrical circuit identifying the one of the multi-position switch.

3. The method of claim 2, further comprising transmitting the sequence of electrical pulses from the multi-position switch in response to the address message.

4. The method of claim 2, wherein the address message comprises a second sequence of electrical pulses.

5. The method of claim 4, wherein the address message includes between 16 and 23 electrical pulses, the number of electrical pulses being indicative of different addresses.

6. The method of claim 2, further comprising:
transmitting another address message after decoding the message, the other address message identifying another multi-position switch; and
repeating the receiving, determining and decoding for another sequence of electrical pulses representing another message sent by the appliance controller.

7. The method of claim 1, wherein the first electrical circuit is a processor-based device electrically coupled to a multi-position switch.

8. The method of claim 1, wherein the multi-position switch has sixteen positions, and wherein the number of received electrical pulses representing the switch position of the multi-position switch is between 1 and 16.

9. The method of claim 1, further comprising transmitting a global message to the multi-position switch, the global message representing a request to the multi-position switch to determine the position of rotatable shaft.

10. The method of claim 1, wherein determining the number of electrical pulses includes measuring the elapsed time from the beginning of the interval.

11. An appliance control system comprising:
a plurality of multi-position switches at least one multi-position switch having a rotatable shaft extending through a housing, the shaft having a first end outside the housing configured to receive a user rotatable knob and a second end inside the housing and communicating with electrical contacts providing a signal indicating a rotated position of the shaft, the housing further containing a first electrical circuit communicating with the electrical contacts to provide a sequence of electrical pulses during an interval in which the number of electrical pulses indicates a position of the rotatable shaft;
a wiring harness having only a single ground referenced data conductor;
an appliance control device in electrical communication with the plurality of multi-position switches, the appliance control device including a processor and a memory module for storing computer instructions that when executed cause the processor to:
receive a sequence of electrical pulses on the single data line during the interval having a pre-determined time period as determined from a timer contained at the appliance control device, the sequence of electrical pulses representing a message from one of the plurality of multi-position switches;
determine the number of received electrical pulses in the sequence of electrical pulses; and decode the message based on the determined number of electrical pulses received during the interval; and
control an electrical load of the appliance based on the decoded message.

12. The system of claim 11, wherein the wiring harness is a 3-wire bus structure including a power line.

13. The system of claim 11, wherein the instructions stored on the memory module of the control device further comprise instructions that when executed cause the processor of the control device to transmit an address message identifying the one of the plurality of multi-position switches.

14. The system of claim 13, wherein the address message comprises a second sequence of electrical pulses.

15. The system of claim 14, wherein the plurality of multi-position switches includes eight devices, and wherein the address message includes between 16 and 23 electrical pulses, the number of electrical pulses being indicative of the one of the plurality of multi-position switches.

16. The system of claim 13, wherein the memory module of the control device further includes stored instruction that when executed cause the processor of the appliance control device to:
transmit another address message after decoding the message, the other address message identifying another multi-position switches of the plurality of multi-position switches; and repeat, the receive, determine and decode for another sequence of electrical pulses representing another message sent by the other multi-position switches of the plurality of multi-position switches.

17. The system of claim 11, wherein the first electrical circuits of each of the plurality of multi-position switches further comprises a corresponding processor electrically coupled to the corresponding multi-position switch.

18. The system of claim 11, wherein at least one of the multi-position switches has sixteen positions, and wherein the number of the received electrical pulses representing the switch position of the multi-position switch of the one of the plurality of multi-position switches is between 1 and 16.

19. The system of claim 11, wherein the memory module of the appliance control device further comprises stored instructions that when executed cause the processor of the control device to transmit a global message to at least some of the plurality of multi-position switches, the global message representing a request to each of the at least some of the plurality of multi-position switches to determine the position of the respective multi-position switch of the each of the at least some of the plurality of multi-position switches.

20. The system of claim 11, wherein the control device further comprises a timing circuit configured to measure elapsed time from the beginning of the interval.

21. The system of claim 11, wherein the memory module of the appliance control device further includes stored instruction that when executed cause the processor of the appliance control device to: generate, based on the decoded message, control signals to control one or more electrical loads.

22. The system of claim 21, wherein the one or more electrical loads includes at least one of: a motor, and a heating element.

* * * * *